US012752342B2

(12) United States Patent
Jansson et al.

(10) Patent No.: US 12,752,342 B2
(45) Date of Patent: Oct. 6, 2026

(54) COMPOSITE POWDER WITH IRON BASED PARTICLES COATED WITH GRAPHENE MATERIAL

(71) Applicant: GraphMaTech AB, Uppsala (SE)

(72) Inventors: Ulf Jansson, Uppsala (SE); Simon Tidén, Uppsala (SE); Mamoun Taher, Uppsala (SE); Luis Diaz, Sollentuna (SE); Tommi Remonen, Mariehamn (FI)

(73) Assignee: GraphMaTech AB, Uppsala (SE)

( * ) Notice: Subject to any disclaimer, the term of this patent is extended or adjusted under 35 U.S.C. 154(b) by 0 days.

(21) Appl. No.: 17/760,812

(22) PCT Filed: Sep. 17, 2020

(86) PCT No.: PCT/SE2020/050870
§ 371 (c)(1),
(2) Date: Mar. 16, 2022

(87) PCT Pub. No.: WO2021/054887
PCT Pub. Date: Mar. 25, 2021

(65) Prior Publication Data

US 2022/0339697 A1 Oct. 27, 2022

(30) Foreign Application Priority Data

Sep. 17, 2019 (SE) .................................... 1951052-8

(51) Int. Cl.
*B22F 1/16* (2022.01)
*B22F 1/065* (2022.01)
(Continued)

(52) U.S. Cl.
CPC ................ *B22F 10/28* (2021.01); *B22F 1/16* (2022.01); *B22F 2301/35* (2013.01);
(Continued)

(58) Field of Classification Search
None
See application file for complete search history.

(56) References Cited

U.S. PATENT DOCUMENTS 10,150,874 B2 12/2018 Böhm et al.
2011/0256014 A1 10/2011 Hong et al.
(Continued)

FOREIGN PATENT DOCUMENTS

CN 106189138 A 12/2016
CN 106744857 A 5/2017
(Continued)

OTHER PUBLICATIONS

English translation of Cao et al. CN 107058903 (Year: 2017).*
(Continued)

*Primary Examiner* — Ronak C Patel
(74) *Attorney, Agent, or Firm* — Morgan, Lewis & Bockius LLP

(57) ABSTRACT

The present invention relates to graphene coated iron based particles and a method of producing such. Provided is a composite powder suitable for powder metallurgy and additive manufacturing processes comprising particles of an iron based material with a coating of a graphene based material wherein the concentration of the graphene based material is between 0.1 wt % and 1.0 wt %.

18 Claims, 7 Drawing Sheets

(51) Int. Cl.
*B22F 10/28* (2021.01)
*B33Y 70/10* (2020.01)
*B33Y 80/00* (2015.01)

(52) U.S. Cl.
CPC ....... *B22F 2302/40* (2013.01); *B22F 2303/20* (2013.01); *B22F 2304/10* (2013.01); *B22F 2998/10* (2013.01); *B22F 2999/00* (2013.01); *B33Y 70/10* (2020.01); *B33Y 80/00* (2014.12)

(56) References Cited

U.S. PATENT DOCUMENTS

| | | | | |
|---|---|---|---|---|
| 2016/0372228 | A1 | 12/2016 | She et al. | |
| 2017/0044416 | A1 | 2/2017 | Sharon et al. | |
| 2017/0225233 | A1 | 8/2017 | Zhamu et al. | |
| 2018/0194630 | A1* | 7/2018 | Cai | B01J 13/02 |
| 2019/0185391 | A1* | 6/2019 | Gu | B22F 1/16 |

FOREIGN PATENT DOCUMENTS

| | | | |
|---|---|---|---|
| CN | 107058903 | A | 8/2017 |
| CN | 108941534 | A | 12/2018 |
| CN | 109972022 | A | 7/2019 |
| EP | 2623459 | A1 | 8/2013 |
| JP | 2018-184639 | A | 11/2018 |
| JP | 2019-070186 | A | 5/2019 |
| WO | 2012/154677 | A1 | 11/2012 |
| WO | 2016/107924 | A1 | 7/2016 |
| WO | 2018/189146 | A1 | 10/2018 |
| WO | 2019/054931 | A1 | 3/2019 |

OTHER PUBLICATIONS

English translation of KR 101400899 (Year: 2014).*
English translation of Ni et al. CN-105903953 (Year: 2016).*
English translation of Kawasaki et al. (JP 2019/070186). (Year: 2019).*
English translation of Kawaguchi et al. (JP 2018/184639) (Year: 2018).*
English translation of Zhou et al. (CN 108941534). (Year: 2018).*
International Search Report and Written Opinion dated Sep. 30, 2020, issued in corresponding International Patent Application No. PCT/SE2020/050870.
Search Report dated Mar. 24, 2020, issued in corresponding Swedish Patent Application No. 1951052-8.
Vock et al., "Powders for powder bed fusion: a review", Progress in Additive Manufacturing (2019) 4:383-397 (https://doi.org/10.1007/s40964-019-00078-6).
Office Action dated Nov. 11, 2024, issued in corresponding Japanese Patent Application No. 2022-517361.

* cited by examiner

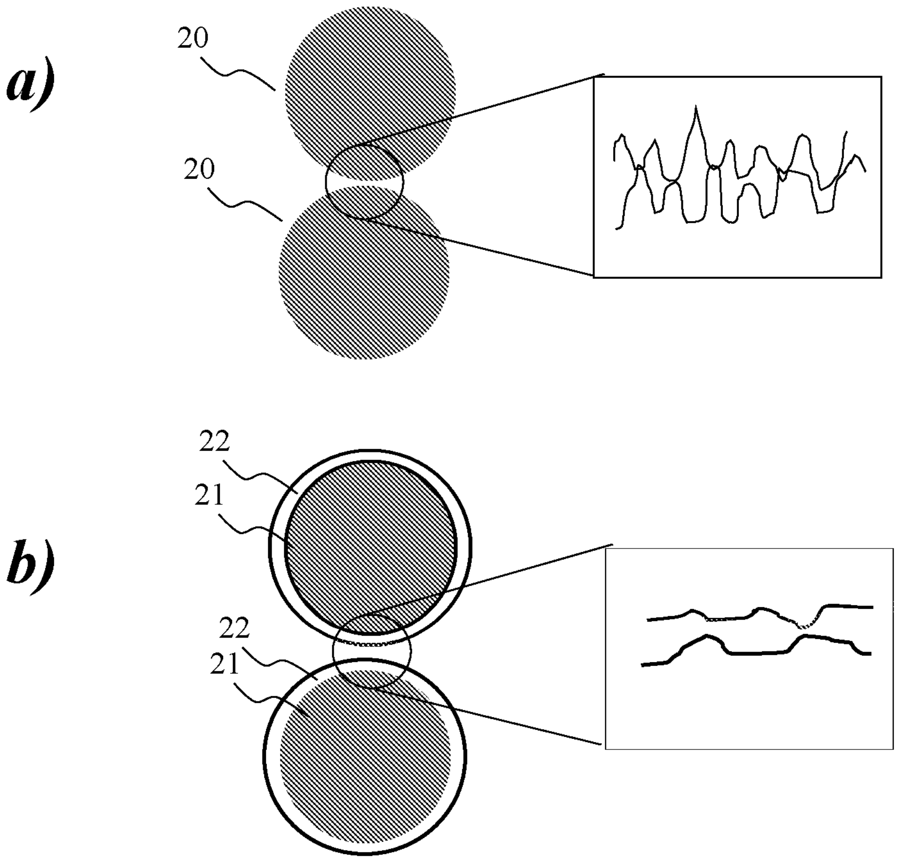
Fig. 2a-b
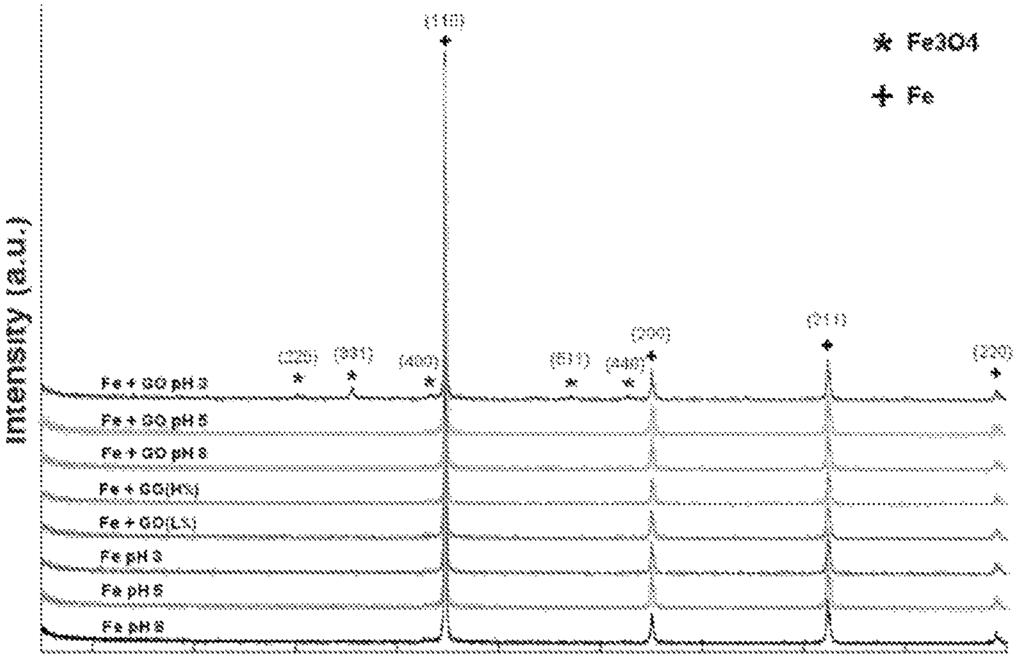
Fig. 3

*a)*
*b)*
*c)*
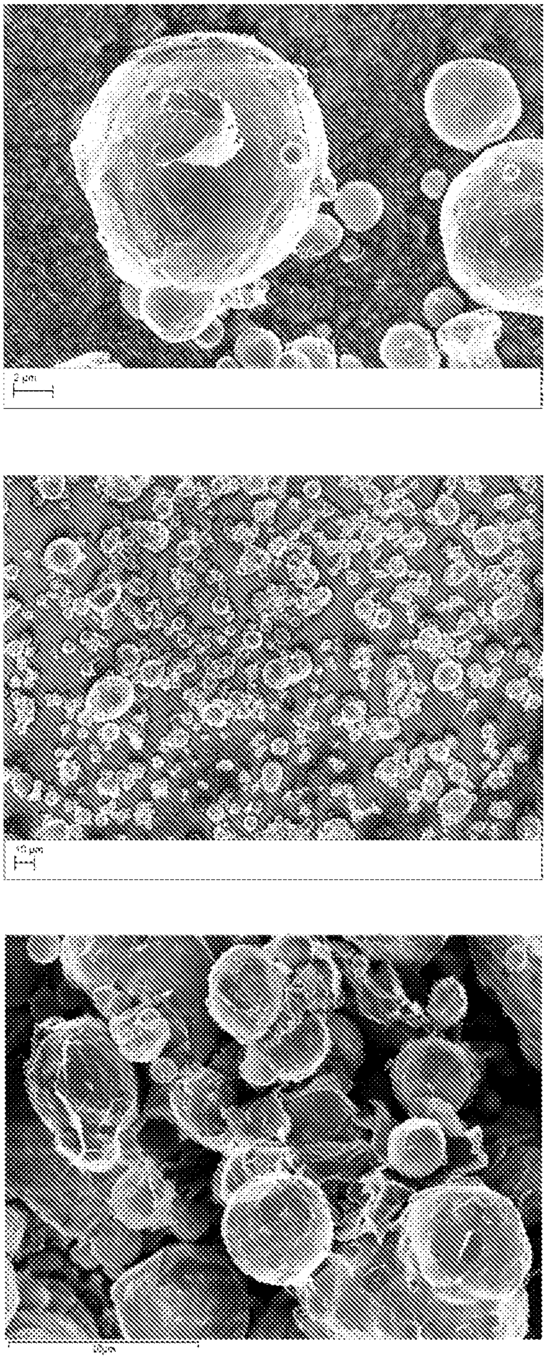
*Fig. 4a-c* a) b)
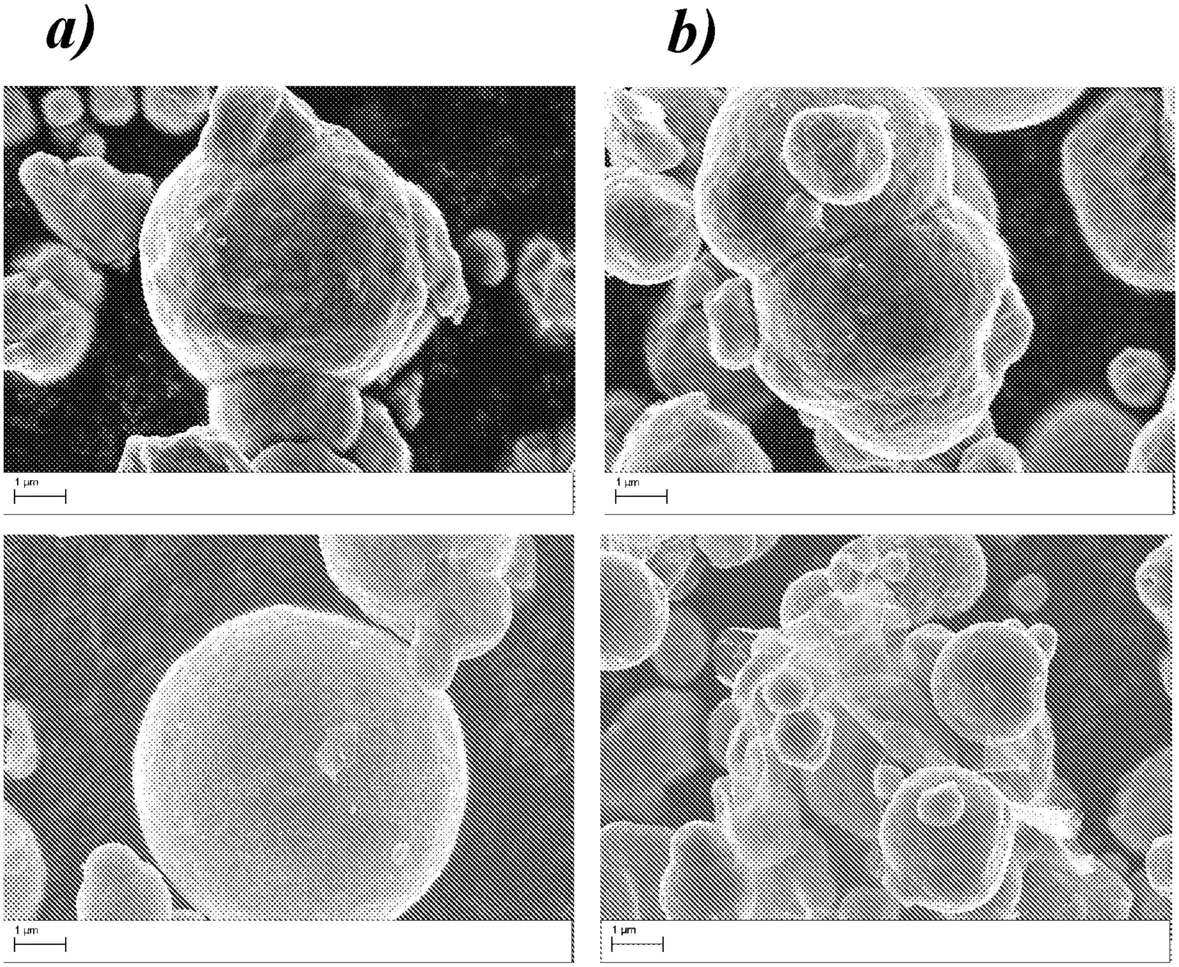
c) d)
*Fig. 6a-d*

COMPOSITE POWDER WITH IRON BASED PARTICLES COATED WITH GRAPHENE MATERIAL

FIELD OF THE INVENTION

The present invention relates to graphene coated iron based particles and a method of producing such, and in particular to stainless steel and iron particles coated with graphene or graphene-based material to optimize the particles for additive manufacturing processes.

BACKGROUND OF THE INVENTION

Additive manufacturing (AM), or 3D printing, is a manufacturing technology which allows for the formation of complex 3D objects under computer control. It allows for rapid prototyping and manufacturing of plastic and metal parts. Additive manufacturing is an umbrella term that includes several techniques such as for example Selective Laser Sintering (SLS), Selective Laser Melting (SLM), Electron Beam Melting (EBM), Fused Deposition Modeling (FDM) and stereolithography (SLA) among other techniques.

Metal powder based technologies dominate in the area of AM for producing metal products. Final products with complex geometries and tailored properties such as strength and hardness may be manufactured by powder based AM. Parts are manufactured by melting metal powder, layer by layer, the melting performed by heating with a laser or electron beam. Typically the layers are formed by a method commonly referred to as the powder bed method. In a powder bed method the machine reads data from a 3D CAD model and lays down successive layers of powdered metal. These layers are melted together utilizing a computer-controlled electron or laser beam. In this way the final part its build up. The process takes place under vacuum (electron beam) or under a controlled atmosphere (laser beam), which makes it suited to manufacture parts in reactive materials with a high affinity for oxygen, e.g. titanium and iron.

The distribution of the metal powder is crucial in the manufacturing process. The metal powder is typically provided to a building platform, or after the first layer, to the top of the part under construction, via a nozzle. A precision rake is often used to even out the supplied metal powder over the top surface. Alternatively, the powder may be rolled out to form the powder bed. To keep the thickness as well as the density (packing density) constant over the bed within given tolerances is a major concern in all techniques utilizing metal powder. A multitude of physical and chemical properties effects how the metal powder will “behave” on forming the powder bed, including the size and shape of the particles, surface roughness, and surface chemistry such as tendency to react with surrounding substances. These properties are often summarized in a density measure such as packing density or tapping density and a measure relating to how the metal powder flows or “flowability”. As the technologies have evolved towards thinner layers to better control the building process and material characteristics, the need for controlling the packing density and the flowability has increased. Also, the melting techniques used for AM put different demands on the starting powder and may be variously sensitive to flowability characteristics. AM methods utilizing laser sintering/melting, for example, typically requires smaller metal particle sizes than electron beam based methods. Generally smaller particle sizes accentuate flowability problems.

Packing and flowability are recognized as problem areas within the AM community. The problems have been addressed by for example controlling the environment (especially controlling moisture), introducing coatings to make particles inert and by adding lubricants to the powder, for example graphite containing lubricants. However the alloy forming the final product, for example a stainless steel alloy, is often sensitive to impurities. The carbon content, for example, will affect the stainless steel properties significantly and only slight variations may be problematic. Therefore any additive or composite should either not affect the properties of the final product or should be possible to control in a manner that the effect is controllable, reproducible and not deteriorating.

To better control packing and flowability is of importance also for other technologies than AM, for example for classic powder metallurgy, PM, including producing so called green bodies and advanced sintering techniques such as hot isostatic pressure techniques, HIP and wet binder techniques WO 2018/189146A1 discloses sliding contacts formed of an Ag and graphene oxide composite material, wherein a Ag+GO composite powder was formed as an intermediate product. A GO content of around 0.01 wt % was found suitable for a remarkable reduction of friction of the final product, the sliding contact.

U.S. Pat. No. 10,150,874 discloses coating of steel and/or zinc for corrosion inhibition wherein the coating contain graphene.

US 2011/0256014 discloses a graphene coating of a “base metal powder”. The graphene is interposed as thin layers between the metal particles. The graphene layers are formed via reduction of graphene oxide.

WO 2019/054931 discloses a multilayer graphene material which may be provided on a substrate, for example a metal substrate The multilayer graphene material comprises layers of graphene-based materials and in-between the graphene-based layers there is a third intermediate layer comprising salt that has ions comprising at least two cyclic, planar groups capable of forming π-π stacking interaction with the layer(s) comprising graphene-based material.

In the prior art there is still a need for composite metal powders with flowability properties optimized for powder metallurgy and additive manufacturing.

SUMMARY OF THE INVENTION

The object of the present invention is to provide a composite powder suitable for additive manufacturing and powder metallurgy, and in particular a composite powder comprising particles with an iron based core and a graphene based coating.

This is achieved by the composite powder as defined in claim 1 and the method as defined in claim 10.

The composite powder according to the invention is suitable for powder metallurgy and additive manufacturing processes and comprises particles of an iron based material with a coating of a graphene based material, wherein the concentration of graphene based material is between 0.1 wt % and 1.0 wt %.

According to aspects of the invention the concentration of graphene based material is between between 0.1 wt % and 0.95 wt %, and even more preferably between 0.1 wt % and 0.5 wt %.

According to one aspect of the invention the iron based material of the particles comprises pure iron with unavoidable impurities.

According to one aspect of the invention iron based particles material of the particles is a stainless steel with unavoidable impurities.

According to one aspect of the invention the particles of the iron based material has a size distribution wherein a majority of the particles is in the range of 1-500 μm, preferably in the range of 1-100 μm and more preferably in the range 1-50 μm.

According to one aspect of the invention the graphene based material of the coating is graphene oxide (GO).

According to one aspect of the invention the graphene based material of the coating is a reduced graphene oxide (rGO).

According to one aspect of the invention the graphene based material of the coating is a mixture of graphene oxide (GO) and reduced graphene oxide (rGO).

The method according to the invention comprises the steps of:

- providing an iron base metal powder with a known size distribution;
- providing a graphene based material in dispersion;
- diluting the graphene based material and adjusting the pH with addition of a basic substance, while recording the concentration of the graphene based material in the solution, wherein the pH is adjusted to be between 3 and 9;
- separating graphene agglomerates of the graphene material by sonication or agitation;
- dispersing the iron based metal powder in de-ionized water or a water/alcohol mixture to create a slurry with predetermined iron based metal to water weight ratio;
- adding the graphene material dispersion to the iron based metal powder slurry in intervals or at a predetermined rate and mixing thoroughly for a predetermined time period; and
- drying the composite powder, wherein the amount of the added graphene material dispersion is adjusted so that the concentration of the graphene material in the dried composite powder is between 0.1 wt % and 1.0 wt %.

According to one aspect of the invention the amount of the added graphene material dispersion is selected so that the concentration of the graphene material is between 0.1 wt % and 0.95 wt % and preferably between 0.1 wt % and 0.5 wt %.

According to one aspect of the invention the iron based material of the particles comprises pure iron, and in the step of dilution and adjusting the pH, the pH is adjusted to be within 4-8, and preferably within 5-7.

According to one aspect of the invention the iron based material is stainless steel, and in the step of dilution and adjusting the pH, the pH is adjusted to be within 3-8, and preferably within 4-7.

According to one aspect of the invention the graphene based material is graphene oxide (GO).

According to one aspect of the invention the graphene based material is a reduced graphene oxide (rGO) or a mixture of reduced graphene oxide and graphene oxide Thanks to the invention a composite powder with improved flowability and fractal surface is provided, greatly improving the powder handling in AM and other PM-based techniques.

One advantage is that the graphene material coating reduces the oxidation of the Fe based material particles.

In the following, the invention will be described in more detail, by way of example, with regard to non-limiting embodiments thereof, reference being made to the accompanying drawings.

BRIEF DESCRIPTION OF THE DRAWINGS

FIG. 2*a* is a schematic illustration of prior art metallic particles and 2b is a schematic illustration of metallic particles coated with graphene material according to the invention;

FIG. 3 are diffractograms of various powders with and without GO coating resulting from the various used pH;

FIG. 4*a-b* are SEM images of embodiments of the invention comprising stainless steel particles, and c) is a SEM image displaying unwanted agglomeration comprising stainless steel particles

FIG. 6*a-d* are SEM images of composite powder comprising metal particles of pure iron and a graphene oxide content of a) 0.05 wt %, b) 0.1 wt %, c) 0.2 wt % and d) 0.5 wt wherein b-) represents embodiments of the invention comprising pure iron particles;

DETAILED DESCRIPTION

Figure 1:
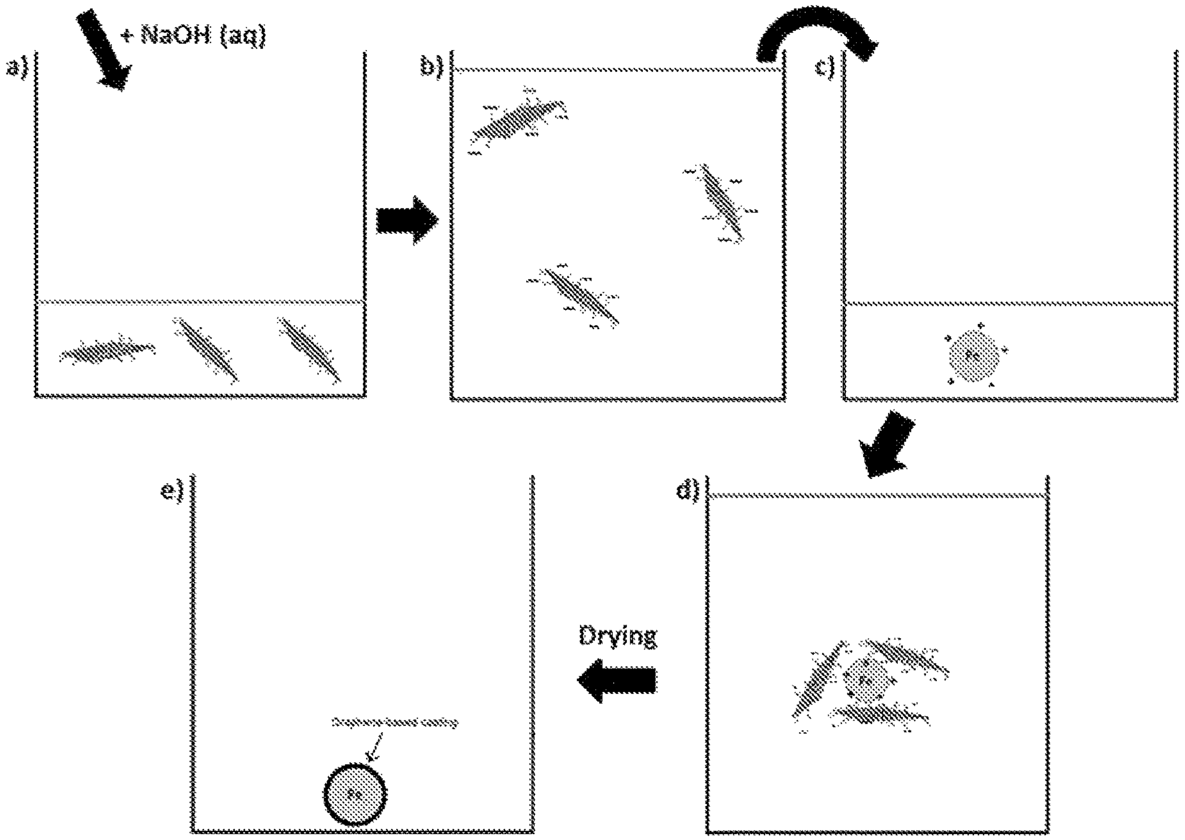
FIG. 1 is a schematic illustration of the method of the invention.

The following terms are defined and used throughout the description and claims:

at % is short for atomic percent, i.e. the number of one kind of atom relative to the total number of atoms;

wt % is short for weight percent, i.e. the weight of one compound relative to the total weight of all compounds in a mixture or composite;

Graphene is an atom thick planar sheet of carbon atoms arranged in a hexagonal lattice structure;

Graphene-based material is a layered material that comprises at least 30 at % carbon and has the properties commonly ascribed to the graphene class of materials The graphene-based material may be any type of graphene, such as single layer graphene, few layers graphene, multi-layered graphene, graphene oxide (GO), reduced graphene oxide (rGO) and graphene nanoplatelets (GNP).

Iron based powder material is a material in which iron is the major constituent such as, but not limited to pure iron and stainless steel. The stainless steel may for example be austenitic steel grade 316 or equivalent. Typical particle size of powder materials suitable for AM and PM is in the range 1-500 μm, depending of AM/PM method to be used. For AM methods utilizing Laser melting/sintering a particle size in the range of 1-100 μm is most suitable, as well as for traditional PM. A comprehensive review is "Powders for powder bed fusion: a review", Silvia Vock et al, Progress in Additive Manufacturing https://doi.org/10.1007/s40964-019-00078-6, which is incorporated herein by reference. Iron based powder materials which is the starting material for the method according to the invention are commercially available in a wide range of compositions, size distributions and qualities. Starting materials may be produced by for example gas atomization or water atomization.

Flowability or powder flowability is defined as the ease with which a powder will flow under a specified set of conditions. Some of these conditions include: the pressure on the powder, the humidity of the air around the powder and the equipment the powder is flowing through or from. Flowability may be measured with revolution powder analysis (RPA) giving a set of parameters characterising the flow properties of the analysed powder material. The properties include: avalanche angle [$^0$], the break energy [KJ/Kg], avalanche energy [KJ/Kg] and surface fractal.

Avalanche Energy [kJ/kg]—Energy released by an avalanche. Calculation: energy level of the powder after an avalanche minus energy level before the avalanche. The RPA reports the average avalanche energy for all powder avalanches.

Break Energy [kJ/kg]—Calculation: Maximum energy level of the sample powder before an avalanche begins minus lowest possible energy level for the powder (flat and even surface). It's based on the powder volume and mass. This value represents the amount of energy required to start each avalanche.

Avalanche Angle [°]—Powder angle at the maximum powder before the start of an avalanche. The measurement is the average value for all the avalanche angles. It's calculated from the centre point on the powder edge to its top point. This angle is the average angle required to start and maintain powder flow.

Surface fractal—The surface fractal is the fractal dimension of the surface of the powder and provides an indication of how rough the surface is. The measurement is made after each avalanche to determine how the powder reorganizes itself. If the powder forms a smooth even surface, the surface fractal will be near two. A rough and jagged surface will give a surface fractal greater than five. For applications requiring an even distribution of powders, such as AM, the closer the surface fractal is to two, the better the powder will perform.

The method of producing a metal powder suitable for AM, the metal powder comprising iron based particles, will be described with references to FIG. 1 and comprises the main steps of:

(not shown) Providing an iron base metal powder with a known size distribution.

(not shown) Providing a graphene based material in dispersion.

(a) Diluting and pH adjusting the graphene based material with distilled water or other dilutant and adjusting the pH with addition of a basic substance, for example NaOH (aq), until the pH is in a predetermined range. The concentration of the graphene based material in the solution is recorded so that it is possible to control the final ratio between graphene material and iron based material, (b) Separating graphene agglomerates of the graphene material by sonication or extensive agitation, for example.

(c) Dispersing the iron based metal powder in de-ionized water or other liquid to create a slurry with predetermined iron based metal to water weight ratio.

(d) Adding the graphene material dispersion to the iron based metal powder dispersion in intervals or at a predetermined slow rate, the slow rate chosen so that the mixing will be effective. Mixing thoroughly the graphene material with the iron base metal powder for at least 2 hours. The amount of the added graphene material dispersion is adjusted so that the concentration of the graphene material is between 0.1 wt % and 1.3 wt % in the final dried composite powder.

(e) Drying the composite powder.

The method may optionally comprise the steps, one or both, to be taken before the drying step, of:

(e2) Filtering of the composite powder (e3) Additionally cleaning the filter cake (filtered off composite powder) with a solvent to remove any impurities, such as for example free graphene or salts.

The steps of filtering should be seen as a non-limiting example. As appreciated by the skilled person filtering or separation may be performed in various ways using different known filtering or sieving techniques.

According to one embodiment of the invention the graphene material is a graphene oxide (GO) in the form of a high concentration (about 2.5 wt %) graphene oxide paste or solution. The iron based material is a pure iron or a stainless steel, for example a austenitic steel grade 316 or equivalent steel, with a particle size distribution within the range of 1-100 μm. According to the embodiment the method comprises the steps of:

(A) Dilution and pH adjusting of the Graphene Oxide Paste.

1. Transfer a specified, by effective mass, amount GO paste to a container.
2. Add DI Water.
3. Check pH of the diluted GO solution. Note: Initial pH of the solution is often around pH 2.
4. Adjust the pH of the solution to a pH within the range of 5 to 8 by adding NaOH 1M solution (pH 14) or equivalent. Finalize the adjustment to the desire pH by adding NaOH 0.1M solution or equivalent. For the stainless steel material a pH in the range 3-8 is suitable. For a pure iron material a pH in the range 4-8 is suitable, due to the increased oxidation at lower pH.
5. Weight the mass of the solution and calculate the final concentration.

(B) Separating graphene agglomerates by sonication of the GO solution for at least 1 hour.

(C-D) Coating of metal particles.

1. Weight the desire quantity of metal powder.
2. Calculate based on the desire concentration the amount of GO Solution required for coating the particles.
3. Transfer the GO Solution to an appropriate container and add 1:1 ratio of deionized (DI) water.
4. Sonicate the solution for 1 hour at room temperature.
5. Transfer the metal powder to a rotary mixing apparatus such as a rotary evaporator, and add DI water until the powder is completely covered.
6. Mix the metal powder in the rotary mixing apparatus for 15 min at 90 r.p.m.
7. Add the prepared GO solution into the rotary mixing apparatus.
8. Mix the powder with the GO solution in the rotary mixing apparatus for 2 h at 90 r.p.m.
9. Start the rotary evaporator vacuum pump, chiller and hot water bath in order to dry the solvents. Alternatively transfer the mixture to separate rotary drying container.
   a. Temperature water bath: 88° C.
   b. Speed: 90 r.p.m
   c. Vacuum 200 mbar-100 mbar
   d. Chiller temperature: 3° C.-10° C.

10. Once the powder is completely dried, turn off the rotary evaporator and remove the material from the container/balloon.

11. Grind the material to a fine powder without agglomerations.

12. Dry the powder in a vacuum oven at 88° C. for 24 h to 35 h in high vacuum.

The embodiment of the method may optionally comprise on of the steps or a combination of the steps, to be taken before the drying step (step 9), of:

Filter of the coated powder to remove most of the water in a buchner funnel using suction Clean the filter cake in the Buchner funnel with DI-water (or Ethanol) to remove free graphene and/or salts Place the filtered powder in an oven at 60° C. (or place the powder in a flask and continue with step 9) for drying at least 12 h then continue at step 11.

In the above example water is used as the process liquid. Also other water miscible solvents could be used, for examples an alcohol such as ethanol or mixtures of alcohols. Also mixtures of water and one or more alcohols, for example an water/ethanol mixture, are embodiments of the method.

The experimental parameters, the detailed times, pressures, solvents and temperatures given in the embodiments using GO should be seen as indications. The exact parameters will depend on the equipment used, the amount of material used and individual choices or preferences regarding for example a processing time in relation to temperature. However, from these indicative parameters the skilled person will be able to make the necessary adjustments for specific equipment and other conditions.

As described in the steps (a) of the general method and steps 3-4 in the above embodiment controlling and adjusting the pH is a way to control the coating formation. At lower pH (1-2) there are attractive electrostatic forces between the GO and the Fe particles, but there is insufficient repulsion between the GO sheets, resulting in agglomerates which are unfavorable when trying to achieve a homogeneous coating. Mostly mixing occur instead. There is also severe oxidation of the Fe particles at low pH (1-2). When the pH is increased (3-4), fewer GO agglomerates are formed and for some application's acceptable corrosion of the Fe particles occurs. At a certain point there is not much oxidation occurring (during the processing step/time) and there are few agglomerates, but there are still attractive electrostatic forces between the GO sheets and the Fe particles. This is in the pH 5-9(10) region.

Increasing the pH will also create more negatively charged groups on the basal planes of the GO sheets, which would be favorable to achieve a good coating. However, at too high pH, the net surface charge of the Fe particles also become negative which creates electrostatic repulsion between the GO sheets and the Fe particles which can clearly be seen for pH values above 10, but could affect the quality of the coating from pH values above 7. If the iron based material has good corrosion resistance by itself, for example a stainless steel grade like grade 316 a lower pH could be chosen without risking surface oxidation of the particles. The influence of pH is summarized in table

TABEL 1

Effects of pH on coating formation and oxidation of the pure iron particles.

| pH | Coating of powder | Oxidation during processing |
|---|---|---|
| 1 | NO (MIXING OCCURE) | HIGH |
| 2 | NO (MIXING OCCURE) | HIGH |
| 3 | YES | ACCEPTABLE |
| 4 | YES | ACCEPTABLE |
| 5 | YES | NO |
| 6 | YES | NO |
| 7 | YES | NO |
| 8 | YES | NO |
| 9 | YES | NO |
| 10 | YES (LOWER DEGREE) | NO |
| 11 | YES (LOW DEGREE) | NO |
| 12 | NO | NO |
| 13 | NO | NO |

According to one embodiment of the invention the pH is adjusted to be within 3-9, and preferably within 3-7.

According to one embodiment of the invention the pH is adjusted to be within 5-8.

According to one embodiment the iron based material is pure iron and the pH is be adjusted to be within 4-8, and preferably within 5-7.

According to one embodiment the iron based material is stainless steel and the pH is adjusted to be within 3-8, and preferably within 4-7.

FIG. 3 are diffractograms of various powders with and without GO coating resulting from the various used pH. Here one can observe slight oxidation, but still acceptable for some applications, of the iron for pH 3 (Magnetite $Fe_3O_4$ peaks can be seen). For the other pH:es this oxidation is not seen. Also in the ready coated powders there is no peak in the area where GO-agglomerates would show up in the diffractogram. This is an indication to that the free and agglomerated GO around the particles is absent (at low values). This is also confirmed by SEM where agglomerates of free GO is scarlessly seen.

In one embodiment of the invention the graphene material is reduced graphene oxide (rGO), a partly reduced graphene oxide or a mixture of graphene oxide and reduced graphene oxide It should be noted that the graphene oxide may be affected by the method. For example, if the starting material is graphene oxide (GO) certain steps, in particular the final drying step, may induce a reduction of the graphene oxide, so that the final composite powder may comprise also reduced graphene oxide (rGO). The reduction mechanisms of GO and how to control them are well known for the skilled person.

According to one embodiment the metal particles are pure iron.

The method according to the invention produces a composite powder comprising Fe-based metal particles with a graphene coating. The method makes it possible to fine-tune the degree of coating and optimize the flowability of the composite powder by varying the concentration of the graphene material in the process and thereby also the concentration in the final composite powder.

Figure 8A:
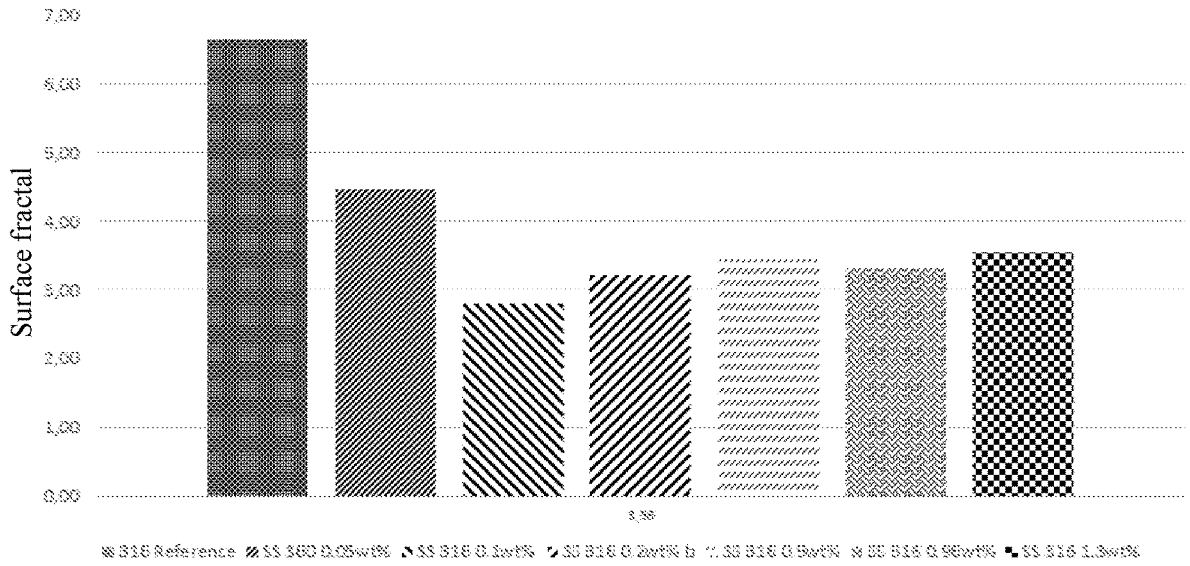
FIG. 8*a-b* are graphs showing the surface fractal for increasing concentrations of graphene material of embodiments of the invention comprising a) stainless steel particles and b) pure iron particles.

FIG. 2 schematically depicts a) two uncoated iron based particles 20 of a metal powder according to prior art and b) two iron based particles 21 coated with graphene material 22 forming a composite powder according to the present invention. The metal-metal contact of the prior art metal powder typically results in considerably higher friction than the graphene-graphene contact of the composite powder according to the invention. This is illustrated by the enlarged sections of FIG. 2. Even in a situation of particle being only partly covered by graphene material, a metal-graphene contact would still exhibit a significant lower friction than the metal-metal contact.

iron), avalanche angle, the break energy, avalanche energy, left two right for the reference sample (non-coated) and increasing concentrations) and FIGS. 8*a* (stainless steel) and 8*b* (pure iron), surface fractal.

TABEL 2a avalanche angle, the break energy, avalanche energy and fractal surface for composite powders with stainless steel particles.

| Concentration | Ref. | 0.05 wt % | 0.1 wt % | 0.2 wt % | 0.5 wt % | 0.95 wt % | 1.3 wt % |
|---|---|---|---|---|---|---|---|
| Avalanche Angle [°] | 63.10 | 67.03 | 51.23 | 57.70 | 59.83 | 60.20 | 61.10 |
| Break Energy [KJ/Kg] | 103.98 | 104.45 | 77.34 | 81.83 | 93.60 | 96.80 | 94.33 |
| Avalanche Energy [KJ/Kg] | 40.24 | 37.14 | 32.30 | 25.35 | 35.76 | 41.33 | 35.80 |
| Fractal surface | 6.64 | 4.74 | 2.81 | 3.11 | 3.46 | 3.33 | 3.56 |

TABEL 2b avalanche angle, the break energy, avalanche energy and fractal surface for composite powders with pure iron particles.

| Concentration | Ref. | 0.05 wt % | 0.1 wt % | 0.2 wt % | 0.5 wt % | 1.0 wt % |
|---|---|---|---|---|---|---|
| Avalanche Angle [°] | 55.67 | 53.8 | 56.1 | 56.2 | 57.2 | 60.5 |
| Break Energy [KJ/Kg] | 97.99 | 80.4 | 77.8 | 81.83 | 80.5 | 79.6 |
| Avalanche Energy [KJ/Kg] | 16.37 | 23.3 | 15.9 | 15 | 20 | 18.3 |
| Fractal surface | 4.31 | 3.42 | 3.16 | 3.14 | 3.34 | 3.42 |

The SEM images of FIG. 4*a-c* depicts a stainless steel particle with a coating of graphene oxide of a composite powder. FIG. 4*a* depicts a stainless steel particle with a coating of graphene oxide of a composite powder with a graphen oxide content of 0.2 wt % verifies that the method according to the invention is capable of producing coated iron based metal particles. This is verified by morphology inspection and by EDS-analysis.

The SEM image of FIG. 4*b* shows a composite powder with a graphene oxide content of 0.5 wt % and illustrates that the composite powder is well dispersed. This is verified by morphology inspection and by EDS-analysis.

Increasing the graphene material concentration to or above 1.3 wt % will cause some agglomerations of the particles in the composite powder as illustrated by the SEM image of FIG. 4*c*.

Figure 5A:
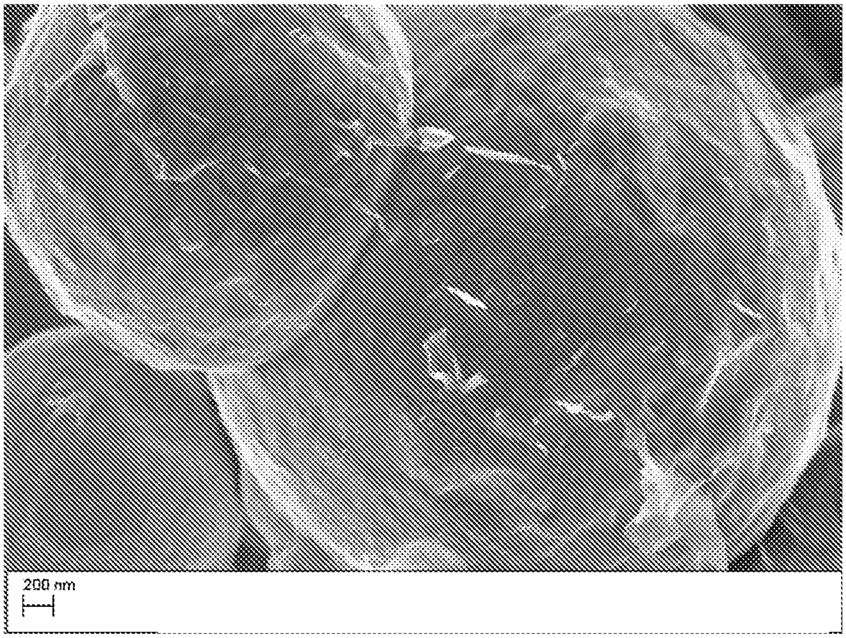
FIG. 5*a-b* are SEM image of embodiments of the invention comprising pure iron particles.
Figure 5B:

The SEM images of FIGS. 5*a* and 5*b* shows pure iron particles of a composite powder with a coating of graphene oxide with a graphene oxide content of 0.1 wt %.

FIG. 6*a-d* are SEM images of composite powder comprising metal particles of pure iron and a graphene oxide content of a) 0.05 wt %, b) 0.1 wt %, c) 0.2 wt % and d) 0.5 wt %. Similar to the composite powder comprising stainless steel particles, the lower graphene oxide concentrations (0.05 wt % and 0.1 wt %) results in a presence of graphene oxide partially covering the particle surface. A graphene oxide concentration of 0.2 wt % result in a particle surface fully covered by graphene oxide. Increasing the graphene oxide concentration further (0.5 wt %) results in an excess of graphene sheets agglomerations separated from the fully covered iron particles.

Figure 7A:
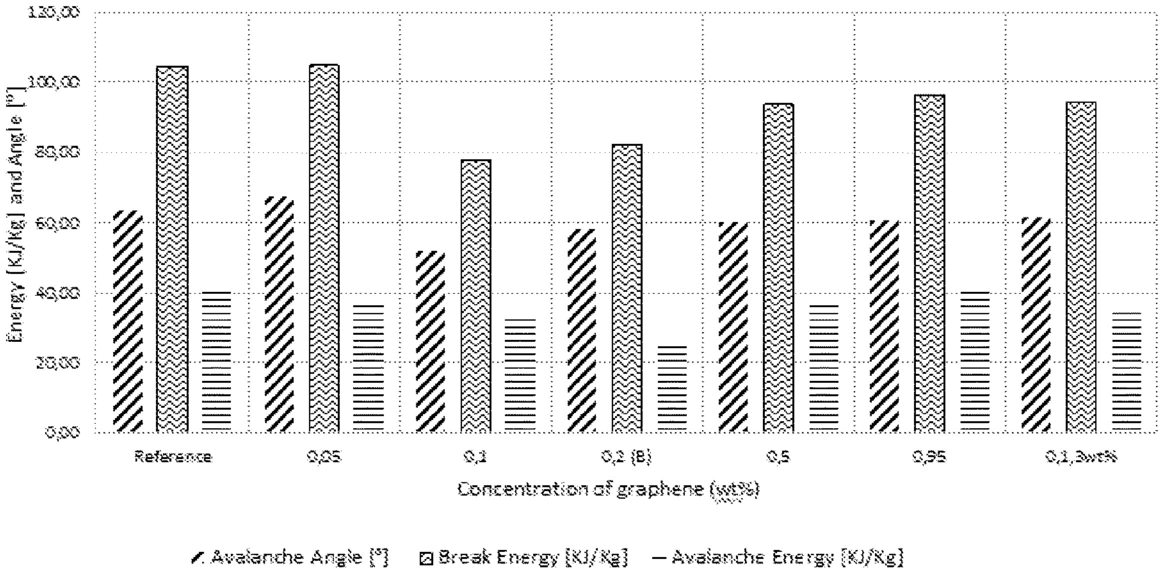
FIG. 7*a-b* are graphs showing the avalanche angle, the break energy and avalanche energy for increasing concentrations of graphene material of embodiments of the invention comprising a) stainless steel particles and b) pure iron particles.

The flowability properties were measured with revolution powder analysis (RPA) and the parameters avalanche angle [°], the break energy [KJ/Kg], avalanche energy [KJ/Kg] and surface fractal for the stainless steel samples are given in table 2a (stainless steel) and table 2b (pure iron and illustrated in the graphs of FIGS. 7*a* (stainless steel) and 7*b* (pure As evident from the flowability measurements a significant reduction in the parameters relating to flowability and surface fractal is apparent also for particles of pure Fe.

The composite powder according to the invention comprises particles with a core of iron based material with a coating of graphene based material wherein the concentration of graphene based material is in the range of 0.1 wt % and 1.0 wt %, preferably between 0.1 wt % and 0.5 wt %, and even more preferably between 0.1 wt % and 0.3 wt %. As apparent for the skilled person the optimum concentration range could be adjusted depending on parameters of the iron based particles, for example their size distribution, wherein it could be accounted for that the surface area scales differently than the mass of the particles. With the knowledge that an optimum range exists, basic geometrical relations and the data here presented, such adjustment does not constitute undue burden for the skilled person. The above described method represents a preferred method of producing the composite powder according to the invention.

Figure 7B:
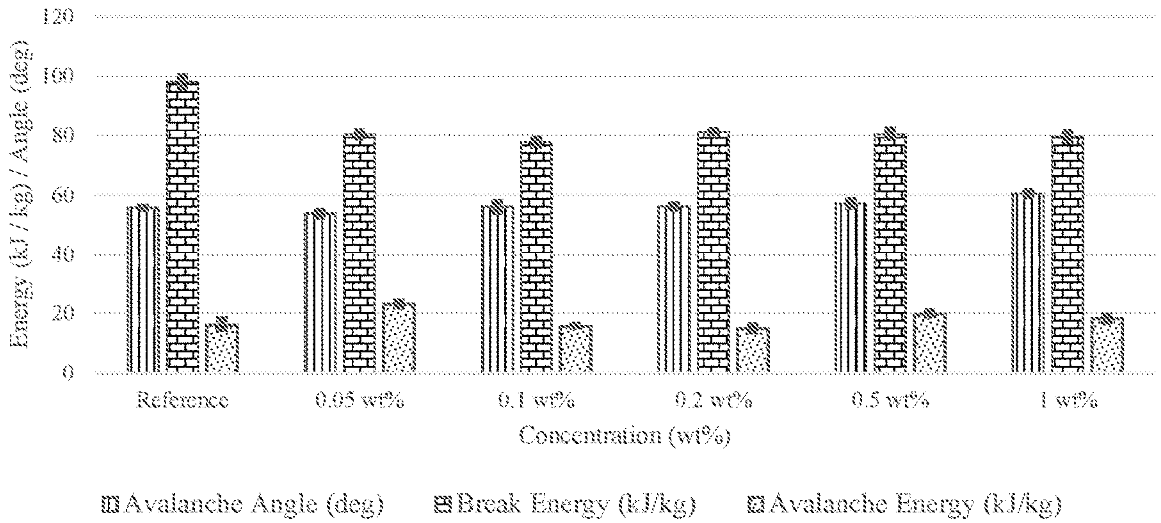
Figure 8B:
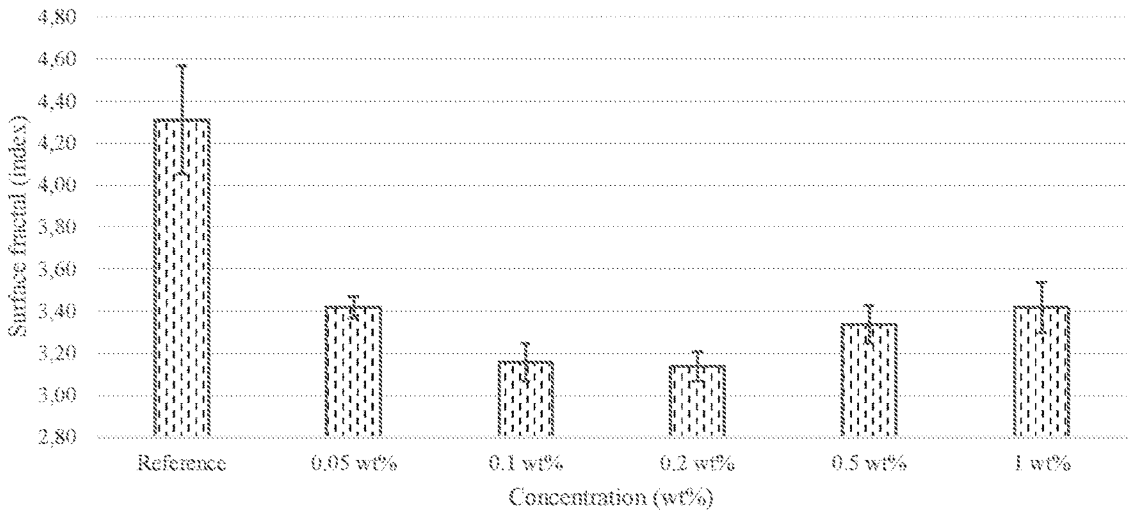

By comparing the flowability data (table 1a and 1b/FIGS. 7-8) and the SEM images it can be noted that the positive effect on the flowability will start to occur at graphene material concentrations not necessarily resulting in fully coated metal particles, for example at 0.1 wt %. The positive flowability effects appear to be fully developed at around 0.2 wt % resulting in fully coated metal particles. As realized by the skilled person terms describing the degree of coating of the metal particles should be interpreted in a statistical meaning: The composite powder will comprises a mixture of fully coated particles and partly coated particles for all concentrations and "fully coated metal particle" and "partly coated metal particle" is a description of a representative composite particle for the different concentrations.

According to one embodiment the graphene based material of the coating comprises graphene oxide. As a result of the production method or by further treatment the graphene oxide may have been at least partly reduced so that the coating comprises a mixture of graphene oxide (GO) and reduced graphene oxide (rGO).

According to one embodiment of the invention the iron based core of the composite powder has a particle size distribution within the range of 1-100 μm, i.e. a particle size range that is known to be suitable for laser sintering/melting and traditional PM. According to one embodiment the iron based core of the composite powder has a particle size distribution is within the range of 1-100 μm.

Both the iron based material and the graphene based material may comprise unavoidable impurities associated with respective material.

Experimental Details

Influence of pH:

To investigate the influence of pH in the coating process, an experimental series ranging from pH 1 to 13 was done. Solutions with pH 1 to 13 were prepared by addition of either NaOH for samples above pH 6, or HCl for samples below pH 6, to de-ionized water. The pH of each sample was controlled with a calibrated VWR pHenomenal 1100 H pH meter. For the pH 6 sample, only de-ionized water was used, as it is slightly acidic due to dissolution of atmospheric carbon dioxide (CO2). The salt concentration was not intentionally increased further in order to avoid changes to the surface charge of graphene oxide (GO), leading to varying salt concentrations in each sample. For each sample, 0.010 g of GO was diluted in 8 ml solution of desired pH, and ultrasonicated for 1 h. Thereafter, 1 g of Fe powder was added, followed by mixing for 1 min. Visual inspection of samples were made before addition of Fe, 1 min after mixing and 1 h after mixing. In addition to this, some of the powder was removed 1 min, 1 h and 20 h after mixing and left to dry at room temperature. Pure Fe powder was also mixed in pH 3, 5 or 8 for 4 h to analyze the effect of corrosion.

GO was diluted in de-ionized water and NaOH solution to yield three dispersions with equal GO concentrations at pH 3.0, 5.4 and 8.0. The dispersions were subsequently ultrasonicated for 60 min, which dissolved all visible precipitates. Metal powder (5 g) and 10 g of de-ionized water was added to a beaker to create a slurry. The ultrasonicated dispersion of GO was slowly added to the metal powder slurry under stirring and thereafter further mixed in a rotary evaporator (Büchi R-300) for 2.5 h at 90 rpm (300 mbar pressure). The composite powder was filtered, rinsed with de-ionized water and dried at 50° C.

Stainless Steel Composition:

The stainless steel is an austenitic stain steel with the composition C 0.03%, Cr 17.0%, Ni 12.0%, Mo 2.5%, Si 0.7%, Mn 1.5%, S 0.03%, P 0.04% and balance Fe.

Metal Particle Size Distribution:

A typical size distribution for the stainless steel particles is given in table 2.

TABEL 2

Typical size distribution for a grade 316 stainless steel powder

| | Particle size (μm) |
|---|---|
| $D_{10}$% | 4.5 |
| $D_{50}$% | 10.5 |
| $D_{90}$% | 22 |

The pure iron particles comprises Alfa Aesar 99.5% Iron and has a size distribution around 10 μm.

Practical tests have been performed with the composite powder comprising iron based material to produce objects with AM (SLM) as well as sintering. The composite powder handled well in the AM equipment and adjustments of printing parameters were considered as non-problematic for the skilled operator. The produced objects have the material properties that is to be expected as compared to objects produced from non-coated starting powder material.

The invention claimed is:

1. A composite powder suitable for powder metallurgy and additive manufacturing processes, the composite powder comprising particles with a core of an iron based material and a coating of a graphene based material, wherein a concentration of the graphene based material is between 0.2 wt % and 1.0 wt %, wherein the core is fully covered by the graphene based material, wherein the graphene based material of the coating is graphene oxide (GO), reduced graphene oxide (rGO), partly reduced graphene oxide, graphene nanoplatelets (GNP), or a mixture of two or more of GO, rGO, partly reduced graphene oxide and GNP, wherein the iron based material core has a size distribution wherein a majority of the particles is in the range of 1-100 μm, wherein the iron based material of the particles is a stainless steel, wherein an avalanche angle of the composite powder is in a range of 57.7° to 60.20°, and wherein an avalanche energy of the composite powder is in a range of 25.35 KJ/Kg to 41.33 KJ/Kg.

2. The composite powder according to claim 1, wherein the concentration of the graphene based material is between 0.2 wt % and 0.95 wt %.

3. The composite powder according to claim 1, wherein the iron based material core has a size distribution wherein a majority of the particles is in the range of 1-50 μm.

4. The composite powder according to claim 1, wherein the graphene based material of the coating is graphene oxide (GO).

5. The composite powder according to claim 1, wherein the graphene based material of the coating is reduced graphene oxide (rGO).

6. The composite powder according to claim 1, wherein the graphene based material of the coating is a mixture of graphene oxide (GO) and reduced graphene oxide (rGO).

7. The composite powder according to claim 1, wherein the graphene based material of the coating is graphene nanoplatelets (GNP).

8. The composite powder according to claim 1, wherein the graphene based material of the coating is the mixture of two or more of GO, rGO, partly reduced graphene oxide and GNP.

9. The composite powder according to claim 1, wherein a break energy of the composite powder is in a range of 81.83 KJ/Kg to 96.80 KJ/Kg.

10. A composite powder suitable for powder metallurgy and additive manufacturing processes, the composite powder comprising particles with a core of an iron based material and a coating of a graphene based material, wherein a concentration of the graphene based material is between 0.2 wt % and 1.0 wt %, wherein the core is fully covered by the graphene based material, wherein the graphene based material of the coating is graphene oxide (GO), reduced graphene oxide (rGO), partly reduced graphene oxide, graphene nanoplatelets (GNP), or a mixture of two or more of GO, rGO, partly reduced graphene oxide and GNP, wherein the iron based material core has a size distribution wherein a majority of the particles is in the range of 1-100 μm, wherein the iron based material of the particles consists of pure iron, wherein an avalanche angle of the composite powder is in a range of 56.2° to 60.5°, and wherein an avalanche energy of the composite powder is in a range of 15 KJ/Kg to 18.3 KJ/Kg.

11. The composite powder according to claim 10, wherein a break energy of the composite powder is in a range of 79.6 KJ/Kg to 81.83 KJ/Kg.

12. The composite powder according to claim 10, wherein the concentration of the graphene based material is between 0.2 wt % and 0.95 wt %.

13. The composite powder according to 10, wherein the iron based material core has a size distribution wherein a majority of the particles is in the range of 1-50 μm.

14. The composite powder according to claim 10, wherein the graphene based material of the coating is graphene oxide (GO).

15. The composite powder according to claim 10, wherein the graphene based material of the coating is reduced graphene oxide (rGO).

16. The composite powder according to claim 10, wherein the graphene based material of the coating is a mixture of graphene oxide (GO) and reduced graphene oxide (rGO).

17. The composite powder according to claim 10, wherein the graphene based material of the coating is graphene nanoplatelets (GNP).

18. The composite powder according to claim 10, wherein the graphene based material of the coating is the mixture of two or more of GO, rGO, partly reduced graphene oxide and GNP.

* * * * *